2 Sheets--Sheet 2.
J. BARNES.
Harvester-Rake.
No. 168,959. Patented Oct. 19, 1875.
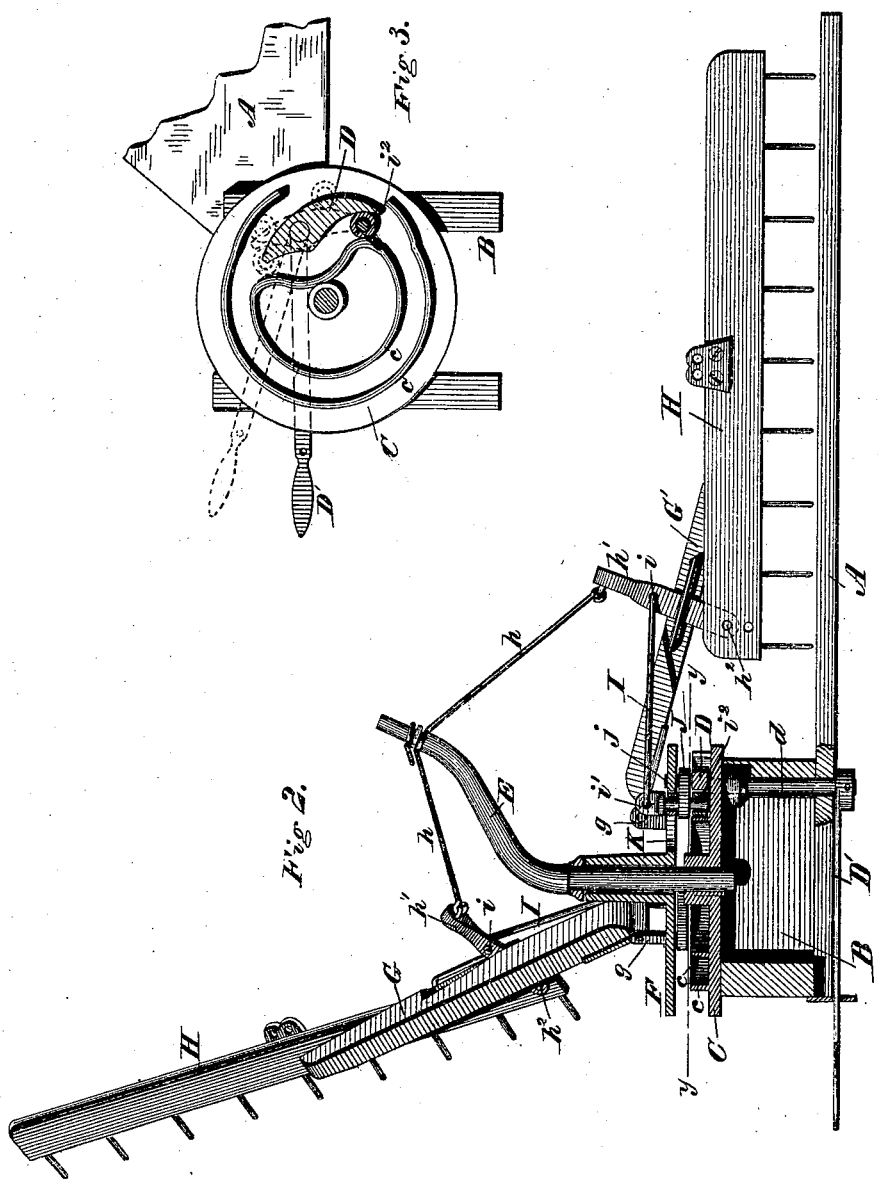
WITNESSES
Harry King
Wm J. Payton
John Barnes. INVENTOR
By his Attorney
W. D. Baldwin

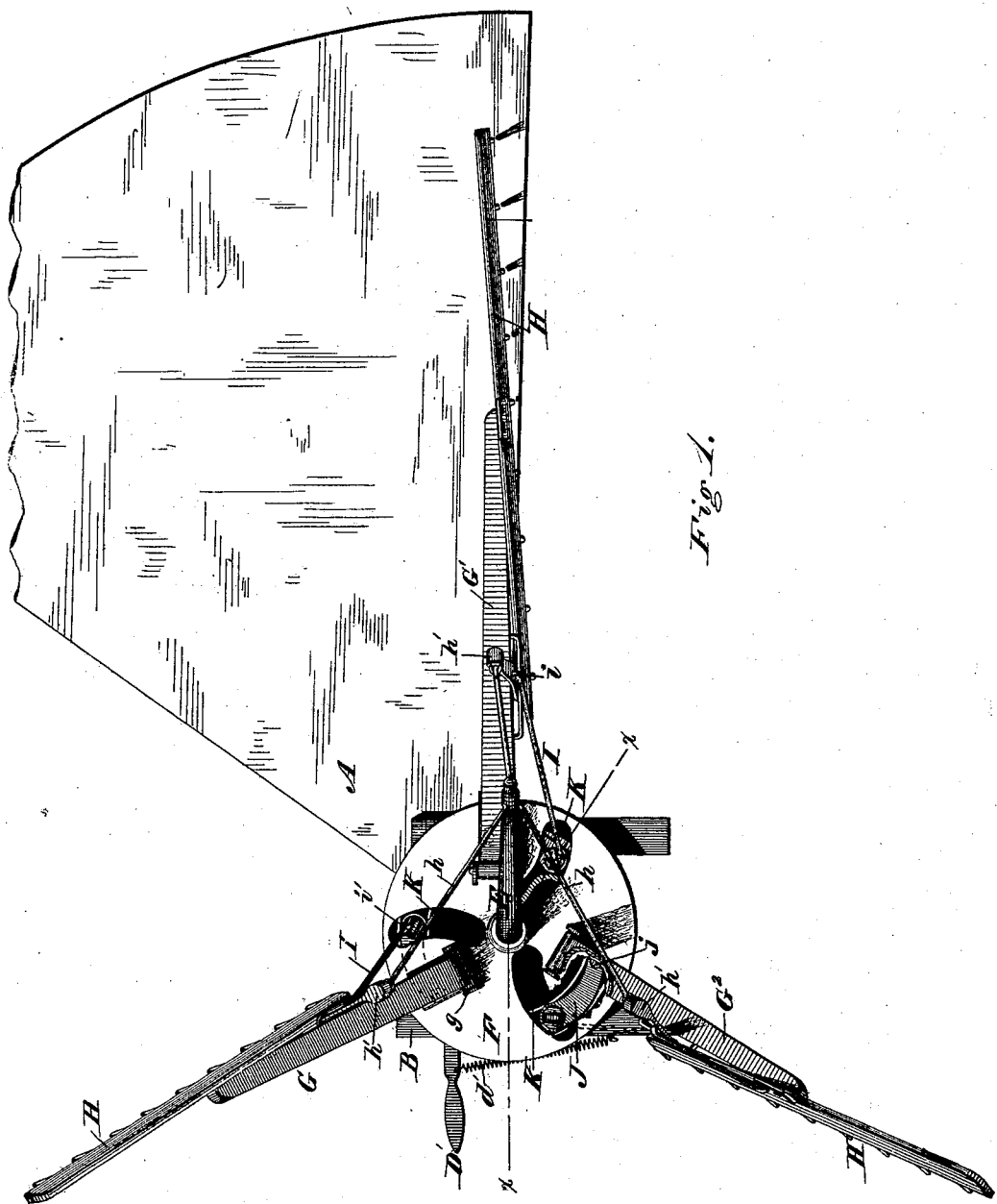

UNITED STATES PATENT OFFICE.

JOHN BARNES, OF ROCKFORD, ILL., ASSIGNOR OF ONE-HALF HIS RIGHT TO RALPH EMERSON AND WILLIAM A. TALCOTT, OF SAME PLACE.

IMPROVEMENT IN HARVESTER-RAKES.

Specification forming part of Letters Patent No. 168,959, dated October 19, 1875; application filed July 15, 1875.

*To all whom it may concern:*

Be it known that I, JOHN BARNES, of Rockford, in the county of Winnebago and State of Illinois, have invented certain new and useful Improvements in Harvester-Rakes, of which the following is a specification:

My invention relates to that class of combined reels and rakes in which are employed a series of revolving rising and falling rake-heads or beaters, any one of which can at pleasure be thrown into action as a rake to vary the frequency of the discharge of the cut grain from the platform. The object of my invention is to render the rake controllable, so as to confer upon it a wide range of adaptability, to conform to the varying conditions under which it is required to operate.

The subject-matter claimed will hereinafter specifically be designated.

In the accompanying drawings, Figure 1 represents a plan or top view of so much of my improved apparatus as is necessary to illustrate the subject-matter herein claimed. Fig. 2 represents a vertical section therethrough on the line $x\,x$ of Fig. 1; and Fig. 3, a horizontal section on the line $y\,y$ of Fig. 2.

My improvements are, of course, adapted to be used on the fully-organized harvesters of the present day, of which A may represent the platform, and B a bracket, yoke, or frame mounted upon the main frame, finger-beam, or platform of the machine. A cam-plate, C, securely fixed upon this frame, is provided with fixed ledges or cam-tracks $c\,c$, and with a switch, D, oscillating horizontally on a rock-shaft, $d$, projecting vertically downward from the frame, and moved by a rocking lever, D', moving in a suitable guide-slot, which acts as a stop to limit its range of movement, and controlled, when desired, by a spring, $d'$, which, when in operation, tends always to keep the switch open, or, in other words, in the position shown by full lines in Fig. 3 of the drawings. A rake-post, E, bent as shown in the drawings, and securely fixed to the frame, extends through the cam-plate, and projects inwardly and upwardly in about the same vertical plane as the finger-beam. A crown-plate, F, revolves around this rake-post and over the cam-plate. Rake-arms G G¹ G² are pivoted in lugs $g$ on this crown-plate, so as to oscillate vertically on pivots therein, and are connected with the bent rake-post, near its top, by means of swivel-links $h$, pivoted to radius-bars $h^1$, in turn pivoted at $h^2$ on the inner end of the rake-head H. A pitman, I, is pivoted at one end to each of the radius-bars at $i$, and at the other to a head, $i^1$, mounted in swiveling bearings on bent arms J, oscillating on pivots $j$ on the under side of the crown-plate, (see Fig. 1,) the heads moving in curved radial slots K in the crown-plate. The heads carry friction-rollers $i^2$, which traverse the cam-tracks and thus raise and lower the rake-arm, or hold it in the desired position through the intervention of the pitman, the radius-bar on the rake-head to which it is pivoted, and the link connecting the radius-bar and rake-post.

From the foregoing description it will be seen that my improved rake embodies features some of which are secured to me by Letters Patent of the United States respectively numbered and dated as follows: No. 85,723, January 12, 1869; No. 114,094, April 25, 1871; No. 157,567, December 8, 1874; No. 157,672, December 15, 1874; and are, of course, not herein claimed *per se;* but my present improvements confer upon the rake a wide range of adjustment, as will be seen from the following description of its operation. In this instance three rake-arms only are shown, but two, four, or even more arms may be used, if desired.

As the rake-post remains fixed in position, each rake-head obviously would sweep close to the platform when passing over it, if not prevented, and will rise in passing forward again to re-enter the standing grain.

If it be desired to cause each rake-head in turn to pass over the platform without sweeping the grain therefrom, it will be necessary to employ a spring to close the switch after the passage of each friction-roller, or it could be done by the driver. This necessity arises from the fact that the switch is so constructed that it is automatically reversed each time the roller passes through it, or, in other words, it is automatically opened and closed, for instance, with the switch closed, as shown in dotted lines in Fig. 3. As the roller traverses the tail end of the switch on the outer side it passes through a space so narrow as to crowd back the switch and throw it open at its forward end, as shown by the full lines in Fig. 3; consequently the succeeding roller passes inside the switch, strikes its tail end, and forces it back into its former position, (shown in dotted lines,) thus causing the succeeding roller to pass outside of the switch, and so on alternately.

When it is remembered that every time the roller passes outside of the switch a rake-head is lifted, and, when it passes inside, one is caused to sweep the platform, the operation of the machine will be obvious. If, therefore, the rake be started with the switch closed, it will be evident that the first and third rake-rollers will pass outside the switch, thus lifting their respective rake-heads above the platform, while the second one will pass inside the switch, and cause its corresponding rake-head to sweep the platform, thus discharging the gavel at the passage of each alternate rake-head. Were the rakes started with the switch open and a roller just entering it, as shown in full lines in Fig. 3, the operation would be reversed—that is, the first and third rake-heads would sweep the platform, while the second would pass over it, but each alternate rake would still sweep the platform.

When it is desired that each rake should in turn discharge a gavel from the platform, I employ a spring, $d'$, which throws the switch open after the passage of each roller, before the succeeding one has had time to pass on the side of the switch opposite to that traversed by the preceding one, thus causing all the rollers to pass on the inside of the switch.

By disconnecting two of the friction-rollers from the rake-head, and using the spring to keep the switch open, one gavel only will be discharged at each revolution of the crown-plate, and by dispensing with the spring while in this condition one gavel only will be discharged for every two revolutions of the crown-plate.

The above description will serve as an indication of the manner in which the frequency of the discharge can be varied with a number of rake-heads different from those shown in the drawing. It will also serve to show the wide range of adaptability conferred upon my rake by these improvements.

I do not broadly claim automatically controlling the frequency of the discharge of the gavel from the platform, for that is old; but What I do claim as new, and desire to secure by Letters Patent, is—

1. The combination, substantially as hereinbefore set forth, of the fixed cam-plate, the rake-post, the crown-plate revolving around the rake-post, a rake-arm pivoted on the crown-plate, the swinging arm pivoted on the crown-plate, a swiveling pitman-head and friction-rollers carried thereby, the link-connection between the swiveling head, the rake-head, and the rake-post, and the switch, for the purposes specified.

2. The combination, substantially as hereinbefore set forth, of the cam-plate, the switch pivoted thereon, the revolving crown-plate, and friction-rollers mounted on swinging arms carried thereby, whereby the switch is automatically reset in alternately opposite positions by the passage of the rollers.

3. The combination, substantially as hereinbefore set forth, of the cam-plate, the switch pivoted thereon, the revolving crown-plate, friction-rollers mounted on swinging arms carried thereby, the switch-lever, and the spring thereon, whereby the switch, although alternately moved in opposite directions by the passage of the rollers, is immediately reset by the spring into proper position.

4. The combination, substantially as hereinbefore set forth, of the cam-plate, switch, rake-post, crown-plate, rake-arms, swinging arms carrying the friction-rollers and swiveling pitman-heads, and the detachable link-connections between the pitman-head and rake-head, whereby the latter may be thrown out of operation as rakes when desired.

In testimony whereof I have hereunto subscribed my name.

JOHN BARNES.

Witnesses:
I. W. IRVINE,
E. K. CONKLING.